United States Patent
Li (10) Patent No.: US 7,857,055 B2
(45) Date of Patent: Dec. 28, 2010

(54) HIGH TEMPERATURE FRACTURING FLUIDS AND METHOD OF USE

(75) Inventor: Leiming Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 105 days.

(21) Appl. No.: 12/256,602

(22) Filed: Oct. 23, 2008

(65) Prior Publication Data

US 2009/0145607 A1    Jun. 11, 2009

Related U.S. Application Data (60) Provisional application No. 61/012,221, filed on Dec. 7, 2007.

(51) Int. Cl.
E21B 43/25    (2006.01)
E21B 43/26    (2006.01)
C09K 8/68    (2006.01)
C09K 8/90    (2006.01)

(52) U.S. Cl. ................ 166/300; 166/305.1; 166/308.5; 507/211; 507/217; 507/224; 507/225; 507/271; 507/903

(58) Field of Classification Search ........................ None
See application file for complete search history.

(56) References Cited

U.S. PATENT DOCUMENTS

| | | | | |
|---|---|---|---|---|
| 3,254,719 A * | 6/1966 | Root | ........................ | 166/308.2 |
| 3,319,715 A * | 5/1967 | Parks | ........................ | 166/305.1 |
| 3,768,565 A * | 10/1973 | Persinski et al. | .......... | 166/308.2 |
| 3,841,402 A * | 10/1974 | Knight et al. | ................ | 166/247 |
| 3,844,348 A * | 10/1974 | Stratton | ....................... | 166/246 |
| 3,937,283 A | 2/1976 | Blauer et al. | | |
| 4,579,670 A | 4/1986 | Payne | | |
| 4,683,068 A * | 7/1987 | Kucera | ........................ | 507/201 |
| 4,801,389 A * | 1/1989 | Brannon et al. | .............. | 507/211 |
| 5,551,516 A | 9/1996 | Norman et al. | | |
| 5,563,186 A * | 10/1996 | Thompson | ................... | 507/209 |
| 5,759,964 A * | 6/1998 | Shuchart et al. | ............. | 507/209 |
| 6,482,866 B1 | 11/2002 | Dahayanake et al. | | |
| 6,703,352 B2 | 3/2004 | Dahayanake et al. | | |
| 6,823,939 B2 | 11/2004 | Bouwmeester et al. | | |
| 2004/0067854 A1 | 4/2004 | Dobson et al. | | |
| 2004/0229756 A1 | 11/2004 | Eoff et al. | | |

(Continued)

FOREIGN PATENT DOCUMENTS

GB    2420577 A    5/2006

*Primary Examiner*—George Suchfield
(74) *Attorney, Agent, or Firm*—Rachel Greene; David Cate; Robin Nava (57) ABSTRACT

A treatment fluid for treating a subterranean formation is formed from an aqueous solution of a polysaccharide, a polyacrylamide, a crosslinking agent, which may be a Group 4 transition metal crosslinking agent, and less than 0.1% by weight of any clay component. In certain embodiments, the polyacrylamide may have an average molecular weight of from greater than 0.5 million to about 20 million and may be present in the fluid in an amount of from about 0.01% to 1% by weight of the fluid. A method of treating a subterranean formation penetrated by a wellbore may be carried out by introducing the treatment fluid into the formation through the wellbore. In certain embodiments, the treatment fluid may be introduced into a portion of the formation having a temperature of 120° C. or higher.

13 Claims, 4 Drawing Sheets

U.S. PATENT DOCUMENTS

2006/0211580 A1    9/2006  Wang et al.
2007/0267191 A1*  11/2007  Pfeiffer et al. ........... 166/252.5
2008/0149333 A1*   6/2008  Putzig ..................... 166/280.2

* cited by examiner

HIGH TEMPERATURE FRACTURING FLUIDS AND METHOD OF USE

CROSS-REFERENCE TO RELATED APPLICATIONS

This application claims the benefit of U.S. Provisional Application No. 61/012,221, filed Dec. 7, 2007, which is hereby incorporated by reference in its entirety.

FIELD OF THE INVENTION

The invention relates to compositions and methods for treating subterranean formations, specifically, stimulation fluids for use in high temperature wells using polymer viscosified fluids.

BACKGROUND

To enhance or increase the production of oil and gas hydrocarbons from wells bored into subterranean formations, it has been common practice to pump a viscous fluid at high pressure down into the wellbore to fracture the formation and force the fracturing fluid into those fractures. The fracturing fluid may also be used to carry sand or other types of particles, called proppants, to hold the fractures open when the pressure is relieved. The fractures held open by the proppant provide additional paths for the oil or gas to reach the wellbore, which increases production from the well.

Because of the high volume of fracturing fluids used, it is desirable to thicken the fracturing fluids with thickeners. Efficient thickeners such as guar gum, and derivatized guar gum, are commonly used. The viscosity of solutions of guar gum and similar thickeners can be greatly enhanced by crosslinking them with metal containing materials. Thus, metal crosslinked guar gum and derivatized guar gum, are useful as fracturing fluids.

Metals, such as boron and metal (aluminum, zirconium, titanium, antimony) complexes are commonly used in the oilfield industry as crosslinkers for these water soluble polymers.

Even with or without such crosslinking agents, at higher temperatures, the viscosity of the polymer thickened fluids may breakdown so that the fluid viscosity is reduced and the fluid is less effective.

Accordingly, improvements are needed in those polymer fluids used and methods of using such fluids in high temperature applications, such as high temperature fracturing operations.

SUMMARY

A treatment fluid for treating a subterranean formation is formed from an aqueous solution of a polysaccharide, a polyacrylamide, a crosslinking agent and less than 0.1% by weight of any clay component. The polysaccharide may be used in an amount of from about 0.1% or more and may be selected from carboxymethylhydroxypropyl guar (CMHPG), carboxymethyl guar, hydroxypropyl guar, guar and combinations of these. The polyacrylamide may be a polyacrylamide homopolymer, a copolymer of acrylamide and acrylate monomers or a copolymer of acrylamide and other monomers and may have an average molecular weight of from greater than 0.5 million to about 20 million. The polyacrylamide may be used in the treatment fluid in an amount of from about 0.01% to about 1% by weight of the fluid.

The crosslinking agent may be a Group 4 transition metal crosslinking agent. The Group 4 transition metal crosslinking agent may be selected from zirconium, titanium, and hafnium crosslinking agents and may be present in an amount of from about 0.01% to about 1.5 percent by weight of the fluid.

The fluid may be used in a method of treating a subterranean formation penetrated by a wellbore. In the method, a treatment fluid is formed comprising an aqueous solution of a polysaccharide, a polyacrylamide, a crosslinking agent and less than 0.1% by weight of any clay component. The treatment fluid is introduced into the formation through the wellbore. In certain instances, the treatment fluid is introduced into the formation through the wellbore at a pressure above the fracture pressure of the formation. The treatment fluid has application for and may be introduced into the formation through the wellbore so that the treatment fluid is introduced into a portion of the formation having a temperature of 120° C. or higher.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

The description and examples are presented herein solely for the purpose of illustrating the various embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the description, each numerical value should be read once as modified by the term "about" (unless already expressly so modified), and then read again as not so modified unless otherwise indicated in context. Also, in the description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The treatment fluids of the invention incorporate a hydratable polymer that is a high molecular weight water-soluble polysaccharide containing cis-hydroxyl functionality for crosslinking with boron. Further, the hydratable polymer may contain carboxylate and/or cationic groups and/or anionic groups that can form a complex with the Group 4 metals (e.g. Ti, Zr, and Hf). Without limitation, useful polysaccharides for the practice of this invention may have average molecular weights typically in the range of about 200,000 to about 3,000,000.

Polysaccharides having adjacent cis-hydroxyl groups for the purposes of the invention include such polysaccharides as the galactomannans. The term galactomannans refers in various aspects to natural occurring polysaccharides derived from various endosperms of seeds. They are primarily composed of D-mannose and D-galactose units. They generally have similar physical properties, such as being soluble in water to form thick, highly viscous solutions which usually can be gelled (crosslinked) by the addition of such inorganic salts as borax. Examples of some plant producing seeds containing galactomannan gums include Tara, Huizache, locust bean, Pola verde, Flame tree, guar bean plant, Honey locust, Lucerne, Kentucky coffee bean, Japanese pagoda tree, Indigo, Jenna, Rattlehox, Clover, Fenurgreek seeds and soy bean hulls. The gum is provided in a convenient particulate form. As a galactomannan, guar gum is a branched copolymer containing a mannose backbone with galactose branches. Of the polysaccharides, guar and its derivatives are particularly well suited for the present invention. These include guar gum, carboxymethylguar, hydroxyethylguar, carboxymethylhydroxyethylguar, carboxymethylhydroxypropylguar (CMHPG, or CMHPG sodium salt, etc.) hydroxypropylguar (HPG), cationically-modified guar, and combinations thereof. Of these, carboxymethylhydroxypropylguar (CMHPG), hydroxypropylguar (HPG) and guar are particularly well suited for the fluids of the present invention. Heteropolysaccharides, such as diutan, may also be used as the hydratable polymer.

The hydratable polymer component may be present in the fluid in an amount of from about 0.1% or less to about 2% or more by weight of the fluid. In certain applications, the hydratable polymer may be present in an amount of from about 0.4% to about 0.7% by weight of the fluid. Use of lower levels may tend to lead to development of insufficient viscosity, while higher concentrations tend to waste material. Where those disadvantages are avoided, higher and lower concentrations may be useful. The hydratable polymer is in general stable in the presence of dissolved salts. Accordingly, ordinary tap water, brines, and the like can be used to prepare the polymer solution.

Incorporated with the fluid is a water dispersible acrylamide polymer. It has been discovered that the acrylamide polymer enhances the fluid's high temperature endurance. The acrylamide polymer may be a homopolymer or a copolymer of acrylamide monomers with one or more different monomers. As used herein, the term homopolymer is meant to encompass polymers having less than about 0.1% by weight of any other monomers. The acrylamide homopolymer is a nonionic polymer made of acrylamide monomers, $CH_2$=$CHCONH_2$. With respect to the acrylamide copolymers, the other non-acrylamide monomers may be selected to provide the acrylamide polymer ionic properties. For example, in the acrylamide-acrylate copolymer, the acrylate segments are anionic. Examples of suitable non-acrylamide monomers include acrylate monomers, such as sodium acrylate, potassium acrylate and ammonium acrylate. Examples of acrylamide copolymers also include acrylamido-methylpropane sulfonate (AMPS)-acrylamide copolymer. The copolymers may be block or random copolymers. The non-acrylamide monomers may make up from about 0.1% to up to about 50% or more of the copolymer, more particularly from about 5% to about 15%. Acrylamide-acrylate copolymers may also be formed by hydrolysis of an acrylamide homopolymer typically conducted with heat under alkaline reaction conditions. As used herein, the expressions "polyacrylamide" or "acrylamide polymer" are meant to include both acrylamide homopolymers and copolymers of acrylamide with other monomers unless stated otherwise or as is apparent from its context.

The polyacrylamide may have an average molecular weight of from greater than 0.5 million to about 20 million, more particularly, from about 5 million to about 15 million. The polyacrylamide may be used in the fluids of the invention in an amount of from about 0.01% to about 1% by weight of the fluid. In certain applications, the polyacrylamide may be used in an amount of from about 0.03% to about 0.4% by weight of the fluid. The polyacrylamide may be added in liquid form, such as dispersed in mineral oil, water or other carrier. The polyacrylamide may also be added in solid or particulate form.

A crosslinking agent is used with the fluids. The crosslinking agents used include Group 4 transition metal compound crosslinking agents. The crosslinking agent may include zirconium, titanium and hafnium crosslinking agents, and combinations of these, and may include organo-metallic compounds. In particular, organo-zirconium and titanium crosslinking agents are useful. Examples of suitable zirconium crosslinking agents include zirconium triethanolamine, L-glutamic acid-triethanolamine-zirconium, zirconium diethanolamine, zirconium tripropanolamine, and zirconium lactate complexes, and/or the related salts, and/or their mixtures. Examples of titanium crosslinking agents include titanium triethanolamine, dihydroxybis (ammonium lactato) titanium, and titanium acetylacetonate. The crosslinking agent may be included in the fluid in an amount of from about 0.01% to about 1.5% by weight of the fluid, more particularly, from about 0.02% to about 0.3% by weight of the fluid.

A hydroxyl ion releasing agent or buffering agent may be employed to adjust the pH or buffer the fluid, i.e., moderate amounts of either a strong base or acid may be added without causing any large change in pH value of the fluid. These may useful in changing the rate of crosslinking. Alkaline amine or polyamine compounds that are useful to raise the pH to the desirable level are outlined in U.S. Pat. No. 4,579,670, and include tetramethylenediamine, triethylenetetramine, tetraethylenepentamine (TEPA), diethylenetriamine, triethylenediamine, triethylenepentamine, ethylenediamen and similar compounds. The alkali metal hydroxides, e.g., sodium hydroxide, and carbonates can also be used. Other acceptable materials are $Ca(OH)_2$, $Mg(OH)_2$, $Bi(OH)_3$, $Co(OH)_2$, $Pb(OH)_2$, $Ni(OH)_2$, $Ba(OH)_2$, and $Sr(OH)_2$. At temperatures above about 175° F. (79.5° C.), potassium fluoride (KF) may be used to prevent the precipitation of MgO when $Mg(OH)_2$ is used as a base, i.e., hydroxyl ion releasing agent.

In various embodiments, the buffering agent is a combination of a weak acid and a salt of the weak acid; an acid salt with a normal salt; or two acid salts. Examples of suitable buffering agents are $NaH_2PO_4$—$Na_2PO_4$; sodium carbonate-sodium bicarbonate; and sodium bicarbonate, or other like agents. By employing a buffering agent instead of merely a hydroxyl ion producing material, a fluid is provided which is more stable to a wide range of pH values found in local water supplies and to the influence of acidic materials located in formations and the like.

Some fluids according to the invention may also include a surfactant. The surfactant acts as a surface active agent and may function as an emulsifier, dispersant, oil-wetter, water-wetter, foamer and defoamer. For example, when the surfactant is used as a foamer, any surfactant for which its ability to aid the dispersion and/or stabilization of any gas component incorporated with the base fluid to form a foamed or energized fluid may be used. Viscoelastic surfactants, such as those described in U.S. Pat. No. 6,703,352 (Dahayanake, et al.) and U.S. Pat. No. 6,482,866 (Dahayanake, et al.), both incorporated herein by reference, may also be suitable for use in fluids of the invention, provided that substantial micelle formation is avoided that may impact the overall characteristics of the gelled fluid. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, $\alpha$-olefin sulfonates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanent, positively charged moiety in the molecule regardless of pH and a negatively charged moiety at alkaline pH. In some embodiments of the invention, the surfactant is a cationic, zwitterionic or amphoteric surfactant containing an amine group or a quaternary ammonium group in its chemical structure ("amine functional surfactant"). A particularly useful surfactant is the amphoteric alkyl amine contained in the surfactant solution AQUAT $94^4$® (available from Baker Petrolite of 12645 W. Airport Blvd, Sugar Land, Tex. 77478 USA). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids of the invention. The fluids may incorporate the surfactant or blend of surfactants in an amount of about 0.02 wt % to about 5 wt % of total liquid phase weight, and more particularly from about 0.05 wt % to about 2 wt % of total liquid phase weight.

The fluids may contain a gas component, as discussed above. The gas component may be provided from any suitable gas that forms an energized fluid or foam when introduced into the aqueous medium. See, for example, U.S. Pat. No. 3,937,283 (Blauer, et al.), hereinafter incorporated by reference. The gas component may comprise a gas selected from nitrogen, air, argon, carbon dioxide, and any mixtures thereof. Particularly useful are the gas components of nitrogen or carbon dioxide, in any quality readily available. The gas component may assist in the fracturing, and also the capacity of the fluid to carry solids, such as proppants. The presence of the gas also enhances the flowback of the fluid to facilitate cleanup. The fluid may contain from about 10% to about 90% volume gas component based upon total fluid volume percent, more particularly from about 20% to about 80% volume gas component based upon total fluid volume percent, and more particularly from about 30% to about 70% volume gas component based upon total fluid volume percent.

Fluids based on the invention may also comprise a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. The breakers may include persulfates such as ammonium persulfate, sodium persulfate, and potassium persulfate, bromates such as sodium bromate and potassium bromate, periodates, metal peroxides such as calcium peroxide, chlorites, and the like, and the combinations of these breakers, live or encapsulated.

Embodiments of the invention may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 mesh (0.841 mm) to about 100 mesh (0.0059 mm) in size. With synthetic proppants, mesh sizes of about 8 (0.937 mm) or greater may be used. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.03 to about 3 kilograms of proppant added per liter of liquid phase. Also, any of the proppant particles can further be coated with a resin to potentially improve the strength, clustering ability, and flow back properties of the proppant.

The aqueous medium of the present invention may be water or brine. In those embodiments of the invention where the aqueous medium is a brine, the brine is water comprising an inorganic salt or organic salt. Inorganic salts may include alkali metal halides, such as potassium chloride. The carrier brine phase may also comprise an organic salt, such as sodium or potassium formate. Inorganic divalent salts include calcium halides, such as calcium chloride or calcium bromide. Sodium bromide, potassium bromide, or cesium bromide may also be used. The salt may be chosen for compatibility reasons i.e. where the reservoir drilling fluid used a particular brine phase and the completion/clean up fluid brine phase is chosen to have the same brine phase.

A fiber component may be included in the fluids of the invention to achieve a variety of properties including improving particle suspension, and particle transport capabilities, and gas phase stability. Fibers used may be hydrophilic or hydrophobic in nature, but hydrophilic fibers may be useful for some applications. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be include at concentrations from about 1 to about 15 grams per liter of the liquid phase of the fluid, in certain applications the concentration of fibers may be from about 2 to about 12 grams per liter of liquid, and in others from about 2 to about 10 grams per liter of liquid.

Fluid embodiments of the invention may further contain other additives and chemicals that are known to be commonly used in oilfield applications by those skilled in the art. These include, but are not necessarily limited to, materials such as surfactants in addition to those mentioned herein, clay stabilizers such as tetramethyl ammonium chloride and/or potassium chloride, breaker aids in addition to those mentioned herein, oxygen scavengers, alcohols, scale inhibitors, corrosion inhibitors, fluid-loss additives, bactericides, and the like. Also, they may include a co-surfactant to optimize viscosity or to minimize the formation of stable emulsions that contain components of crude oil or a polysaccharide or chemically modified polysaccharide, polymers such as cellulose, derivatized cellulose, guar gum, derivatized guar gum, xanthan gum, or synthetic polymers such as polyacrylamides and polyacrylamide copolymers, oxidizers such as ammonium persulfate and sodium bromate, and biocides such as 2,2-dibromo-3-nitrilopropionamine. The fluid should be substantially devoid of hectorite clay or other clay components and such components may be present in the fluid only in amounts of less than 0.1% by weight.

Aqueous fluid embodiments of the invention may also comprise an organoamino compound. Examples of suitable organoamino compounds include, but are not necessarily limited to, tetraethylenepentamine (TEPA), triethylenetetramine, pentaethylenehexamine, triethanolamine, and the like, or any mixtures thereof. When organoamino compounds are used in fluids of the invention, they are incorporated at an amount from about 0.01 wt % to about 2.0 wt % based on total liquid phase weight. The organoamino compound may be incorporated in an amount from about 0.05 wt % to about 1.0 wt % based on total weight of the fluid. A particularly useful organoamino compound is tetraethylenepentamine (TEPA).

The fluids of the invention may be used for hydraulically fracturing a subterranean formation. Techniques for hydraulically fracturing a subterranean formation are known to persons of ordinary skill in the art, and involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference thereto.

In the fracturing treatment, fluids of the present invention may be used in the pad treatment, the proppant stages, or both. The components of the liquid phase may be mixed on the surface. Alternatively, the fluid may be prepared on the surface and pumped down tubing while any gas component could be pumped down the annulus to mix down hole, or vice versa.

The fluids of the invention have particular application for use in high temperature environments. In particular, the fluids may be used in treatments where temperatures of 120° C. to 230° C. or higher are encountered. The fluids have particular application for use in environments of from 300° F. (148.9° C.), 325° F. (162.8° C.), 350° F. (176.7° C.) to 375° F. (190.6° C.), 400° F. (204.4° C.), 425° F. (218.3° C.) or 450° F. (232.2° C.).

The following examples are presented to illustrate the preparation and properties of the fluids and should not be construed to limit the scope of the invention, unless otherwise expressly indicated in the appended claims. All percentages, concentrations, ratios, parts, etc. are by weight unless otherwise noted or apparent from the context of their use.

EXAMPLES

Example 1

Viscosities were compared between viscosified fluids containing CMHPG. A control fluid without polyacrylamide was compared to a test fluid with a polyacrylamide component. The control fluid consisted of 0.54% CMHPG, 0.1% tetramethyl ammonium chloride, about 0.1% sodium diacetate as a hydration aid for CMHPG, 0.51% 2,2',2"-nitrilotriethanol as a high-temperature viscosity stabilizer, 1.5% 120 g/L sodium sesquicarbonate solution, 0.6% sodium thiosulfate pentahydrate, and about 0.07% sodium zirconium lactate as the crosslinker. The test fluid contained 0.54% CMHPG, 0.1% tetramethyl ammonium chloride, about 0.1% sodium diacetate, 0.51% 2,2',2"-nitrilotriethanol, 1.5% 120 g/L sodium sesquicarbonate solution, and 0.6% sodium thiosulfate pentahydrate, and also 0.06% polyacrylamide (i.e., sodium acrylate acrylamide copolymer (molecular weight (MW) is about 5 million, polymer is dispersed in mineral oil) and about 0.07% zirconium-triethanolamine complex crosslinker. Unless otherwise indicated, all viscosities of the examples were measured using a Fann50-type viscometer with a R1/B5 rotor/bob at a shear rate of 100 s$^{-1}$. The results are presented in FIG. 1.

Figure 1:
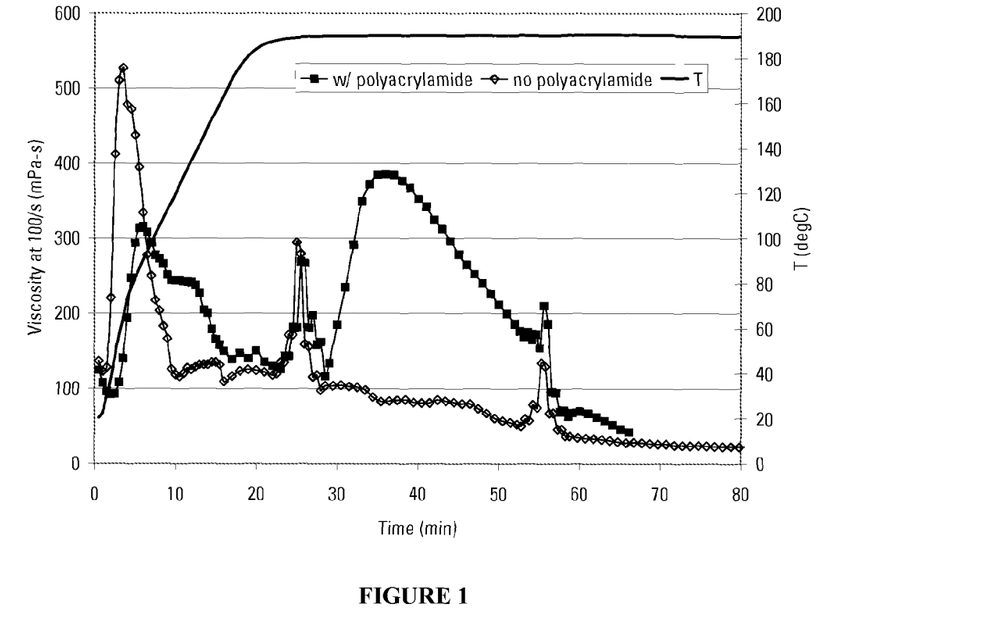
FIG. 1 shows a plot of the fluid viscosities at 191° C. of two aqueous carboxymethylhydroxypropylguar (CMHPG) polymer fluids, with one containing no sodium acrylate acrylamide copolymer component and the other containing 0.06% by weight of a sodium acrylate acrylamide copolymer component.

As shown in FIG. 1, the viscosity of the control fluid without polyacrylamide stayed well below 100 mPa-s when the fluid temperature reached 191° C., while the test fluid with polyacrylamide remained above 100 mPa-s for about 50 minutes at 191° C.

When the CMHPG polymer load was increased to 0.6% in the control fluid, its viscosity at 191° C. behaved qualitatively the same. When the crosslinker of the control fluid was changed to about 0.07% zirconium-triethanolamine complex (same as the crosslinker of the test fluid), no obvious improvement was observed. The viscosity difference was, therefore, mainly caused by the existence of sodium acrylate acrylamide copolymer in the fluid system.

Example 2

Figure 2:
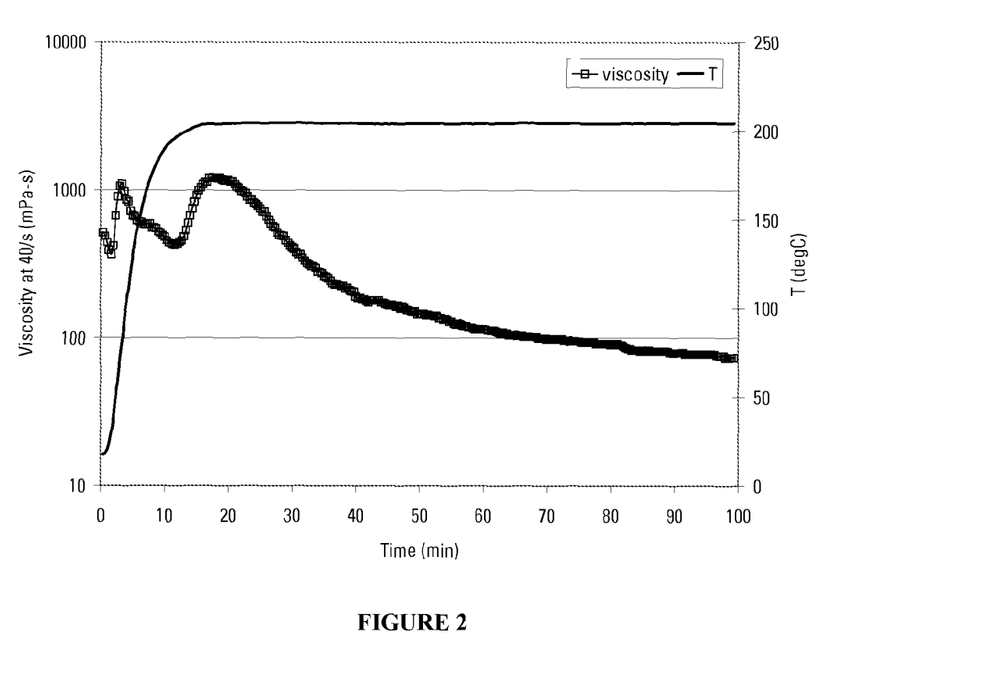
FIG. 2 shows a plot of the fluid viscosities at 204° C. of aqueous CMHPG polymer fluids containing 0.2% by weight of a sodium acrylate acrylamide copolymer at a shear rate of 40 s$^{-1}$.

A fluid containing 0.6% CMHPG, about 0.1% sodium diacetate, 0.51% 2,2',2"-nitrilotriethanol, 3% 120 g/L sodium sesquicarbonate solution, 0.12% sodium thiosulfate pentahydrate, 0.2% sodium acrylate acrylamide copolymer (same polymer as in Example 1), and about 0.07% zirconium-triethanolamine complex crosslinker was tested using a Fann50-type viscometer at a shear rate of 40 s$^{-1}$. The results are presented in FIG. 2. At 204° C., the fluid stayed above 100 mPa-s for about 55 minutes.

Example 3

Figure 3:
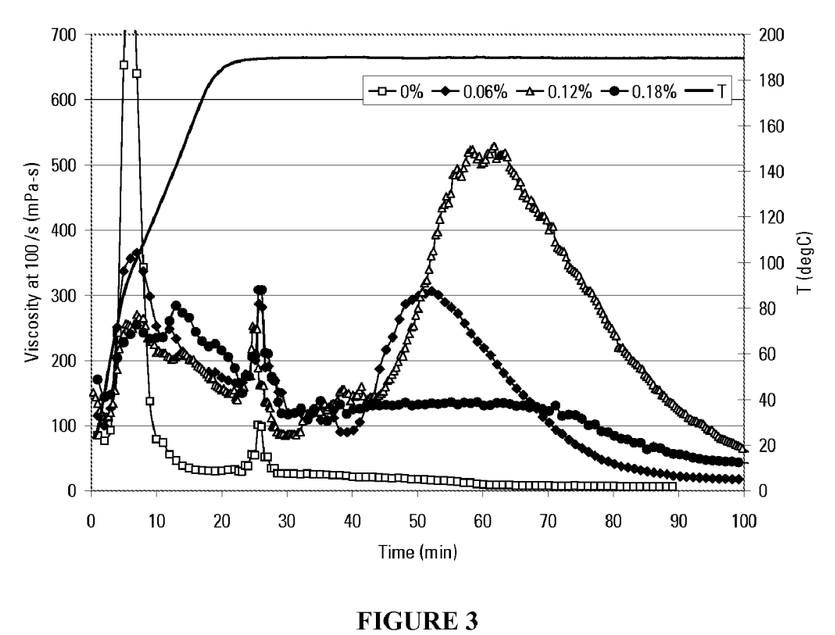
FIG. 3 shows a plot of the fluid viscosities at 191° C. of aqueous CMHPG polymer fluids, with one containing no sodium acrylate acrylamide copolymer and the others containing various amounts of sodium acrylate acrylamide copolymer.

To determine the optimal concentration of polyacrylamide, various concentrations of sodium acrylate acrylamide copolymer (same as in Example 1) were tested using a Fann50-type viscometer. In addition to sodium acrylate acrylamide copolymer, all of the fluids tested contained 0.54% CMHPG, 0.1% tetramethyl ammonium chloride, about 0.1% sodium diacetate, 0.51% 2,2',2"-nitrilotriethanol, 3% 120 g/L sodium sesquicarbonate solution, 0.6% sodium thiosulfate pentahydrate, and about 0.09% zirconium-triethanolamine complex crosslinker. The results are presented in FIG. 3.

The viscosity at 191° C. for the fluids containing 0%, 0.06%, 0.12%, and 0.18% of sodium acrylate acrylamide copolymer (same as in Example 1), respectively, are shown. The fluid with 0.12% sodium acrylate acrylamide copolymer stayed above 100 mPa-s at 191° C. for about 71 minutes (the same fluid stayed above 100 mPa-s for about 82 minutes at 187° C., and for about 121 minutes at 185° C.), and seemed to be the most robust fluid. When the sodium acrylate acrylamide copolymer concentration was decreased or increased, the time above 100 mPa-s appeared shorter in this case. Without sodium acrylate acrylamide copolymer, the fluid viscosity was well below 100 mPa-s at 191° C. From FIG. 3 it can be seen that the fluid without sodium acrylate acrylamide copolymer quickly gelled when the temperature rose to about 93° C., showing a much higher viscosity peak (initial crosslinking peak) than other fluids with sodium acrylate acrylamide copolymer. The pre-mature crosslinking may cause more shear damage in the later stage. The polyacrylamide (sodium acrylate acrylamide copolymer) may delay and/or decrease the initial crosslinking of the CMHPG chains, possibly by absorbing at least some of the Zr-crosslinker, and may then slowly release the Zr-crosslinker back into the fluid later at higher temperature. This may explain the second viscosity peak (not to be confused with the ramp peaks of the Fann50-type viscometer following the API RP 39 schedule that were much narrower) in FIG. 3, for example, at about 60 minutes for the fluid containing 0.12% sodium acrylate acrylamide copolymer. This second (or delayed) crosslinking may be observed with as low as 0.045% sodium acrylate acrylamide copolymer.

Example 4

Figure 4:
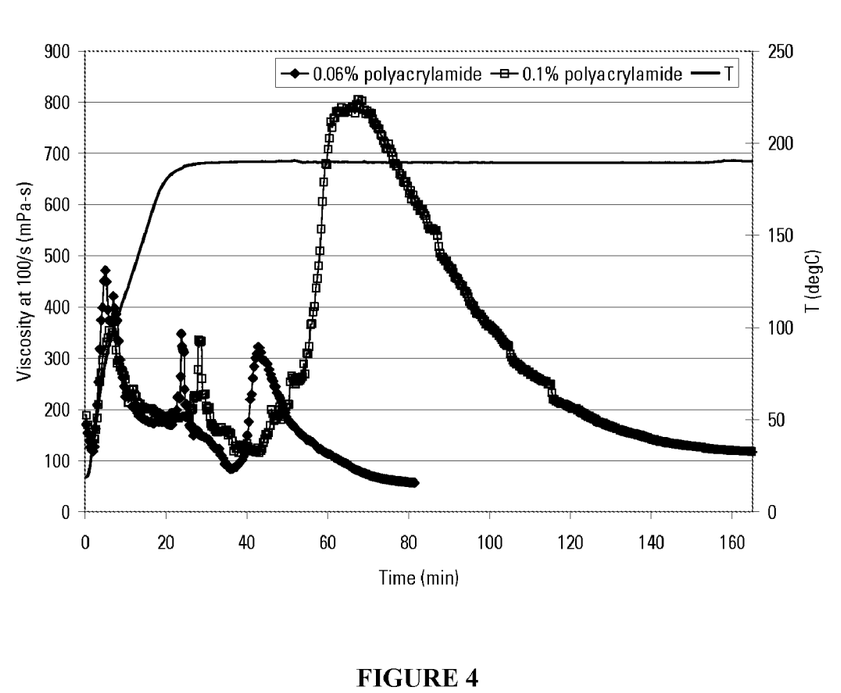
FIG. 4 shows a plot of the fluid viscosities at 191° C. of two aqueous CMHPG polymer fluids, with one containing 0.06% by weight of a sodium acrylate acrylamide copolymer and the other with 0.1% by weight of a sodium acrylate acrylamide copolymer.

In another example similar to that of Example 3, two test fluids were prepared containing 0.6% CMHPG, 0.1% tetramethyl ammonium chloride, about 0.1% sodium diacetate, 0.51% 2,2',2"-nitrilotriethanol, 3% 120 g/L sodium sesquicarbonate solution, 0.6% sodium thiosulfate pentahydrate, and about 0.09% zirconium-triethanolamine complex crosslinker. One also contained 0.06% sodium acrylate acrylamide copolymer, and the other contained 0.1% sodium acrylate acrylamide copolymer (same polymer as in Example 1). The fluid with 0.1% sodium acrylate acrylamide copolymer stayed above 100 mPa-s for over 140 minutes at 191° C. (when 0.04% sodium bromate was added as the breaker, the same fluid stayed over 100 mPa-s for about 1 hour). The fluids were tested using a Fann50-type viscometer. The results are shown in FIG. 4.

Example 5

Figure 5:
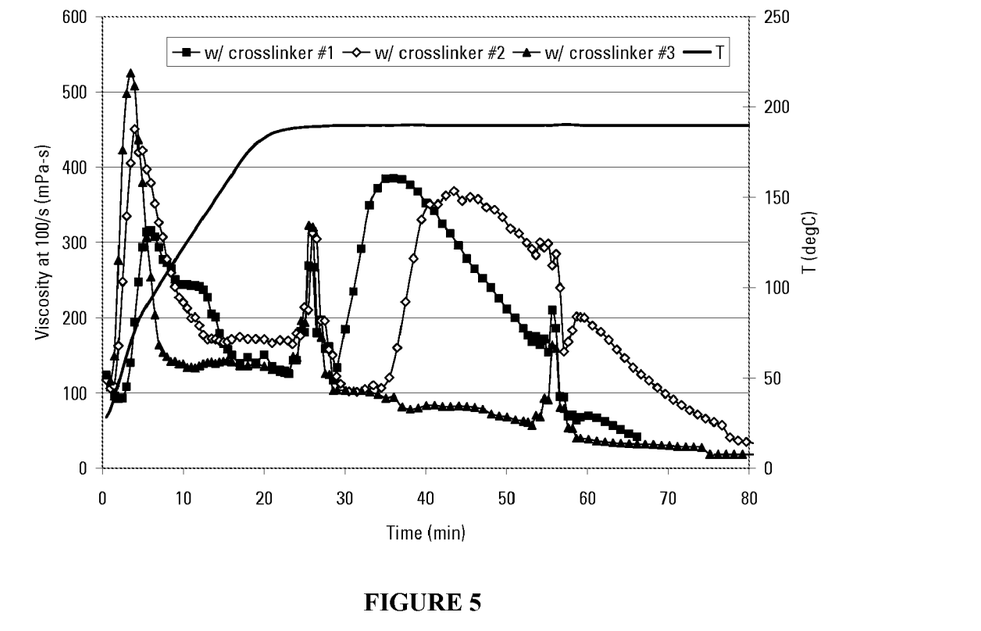
FIG. 5 shows a plot of the fluid viscosities at 191° C. of aqueous CMHPG polymer fluids containing 0.06% by weight of a sodium acrylate acrylamide copolymer with different zirconium crosslinking agents.

The effect of different crosslinking agents was evaluated on test fluids at temperatures of 191° C. or higher. The fluids were tested using a Fann50-type viscometer. The viscosity at 191° C. is shown in FIG. 5 for the three test fluids (all containing 0.54% CMHPG, 0.1% tetramethyl ammonium chloride, about 0.1% sodium diacetate, 0.51% 2,2',2"-nitrilotriethanol, 1.5% 120 g/L sodium sesquicarbonate solution, 0.6% sodium thiosulfate pentahydrate, and 0.06% sodium acrylate acrylamide copolymer) crosslinked with about 0.07% zirconium-triethanolamine complex crosslinker (crosslinker #1), a mixture of 0.035% zirconium-triethanolamine complex crosslinker and 0.035% sodium zirconium lactate crosslinker (crosslinker #2), or about 0.07% sodium zirconium lactate crosslinker (crosslinker #3), respectively. The fluid crosslinked with pure sodium zirconium lactate (crosslinker #3) barely stayed above 100 mPa-s at 191° C., suggesting that Zr atoms chelated with lactate functional group might not endure high temperature. It appeared that the zirconium-triethanolamine complex crosslinker provided a stronger gel than the sodium zirconium lactate crosslinker at high temperatures. For the test fluid with 0.54% CMHPG and 0.06% sodium acrylate acrylamide copolymer, the optimal dosage of the zirconium-triethanolamine complex crosslinker seemed to be about 0.07% and above. For the test fluid with 0.6% CMHPG and 0.06% sodium acrylate acrylamide copolymer (same as in Example 1), an optimal dosage of the zirconium-triethanolamine complex crosslinker appeared to be about 0.09% and above. In the latter case (0.6% CMHPG and 0.06% sodium acrylate acrylamide copolymer), it was observed that increasing the crosslinking agent to above 0.09% did not provide much more fluid stability.

Example 6

Figure 6:
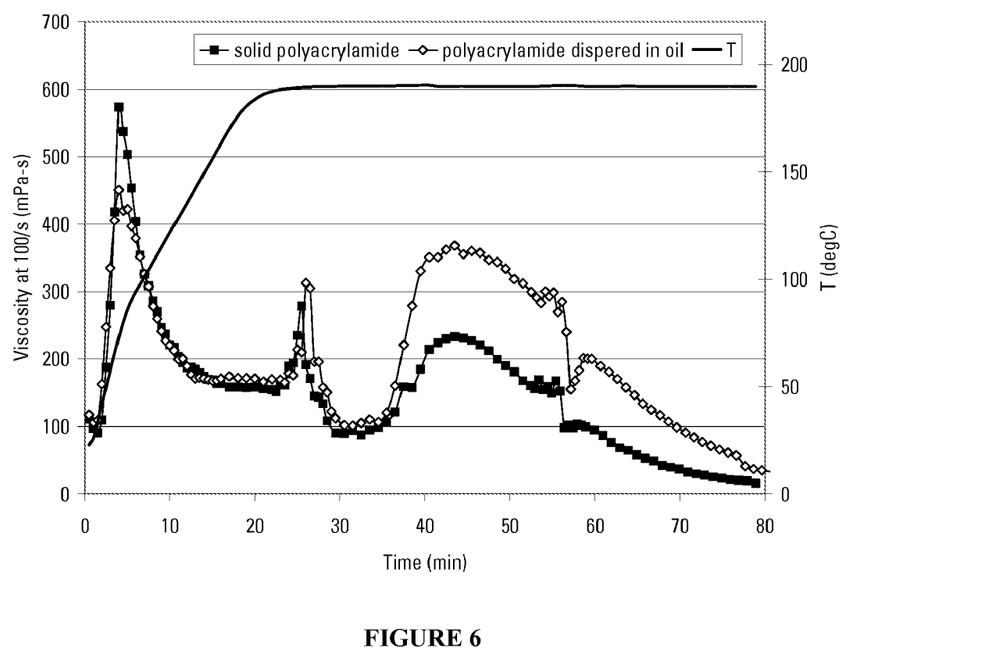
FIG. 6 shows a plot of the fluid viscosities at 191° C. of aqueous CMHPG polymer fluids containing 0.06% by weight of a sodium acrylate acrylamide copolymer added to the fluid either in solid form or pre-dispersed in mineral oil.

Two test fluids containing 0.54% CMHPG, 0.1% tetramethyl ammonium chloride, about 0.1% sodium diacetate, 0.51% 2,2',2"-nitrilotriethanol, 1.5% 120 g/L sodium sesquicarbonate solution, 0.6% sodium thiosulfate pentahydrate, and 0.07% zirconium-triethanolamine complex crosslinker were prepared, with one containing 0.06% solid acrylamide sodium acrylate copolymer particles (MW about 5 million) and the other containing 0.06% sodium acrylate acrylamide copolymer (same as in Example 1) pre-dispersed in mineral oil. The fluids were tested using a Fann50-type viscometer. The results are presented in FIG. 6. The two viscosity curves were qualitatively the same, showing that solid sodium acrylate acrylamide copolymer can be used in place of the same sodium acrylate acrylamide copolymer pre-dispersed in mineral oil, as the source of polyacrylamide. In oilfield operations, it may be feasible to add either polyacrylamide powders or polyacrylamide pre-dispersed in mineral oil. This also suggests that the fluid system is not sensitive to the presence of mineral oil or the like.

Example 7

When the sodium acrylate acrylamide copolymer (same polymer as in Example 1) was replaced with the same weight percentage of sodium acrylate acrylamide copolymer with a molecular weight of about 0.5 million, the fluids failed to withstand 191° C. It appears, therefore, that the molecular weight of the polyacrylamide polymers should be larger than 0.5 million to be effective at higher temperatures. Polyacrylamide with a molecular weight of less than about 0.5 million may still be used when in-situ polymerization, including free radical polymerization, increases its molecular weight to above about 0.5 million.

Example 8

The fluids of the invention are compatible with salts including but not limited to KCl. In one test, 2% KCl was added to a claimed fluid containing 0.06% sodium acrylate acrylamide copolymer, 0.54% CMHPG, 0.1% tetramethyl ammonium chloride, about 0.1% sodium diacetate, 0.51% 2,2',2"-nitrilotriethanol, 3% 120 g/L sodium sesquicarbonate solution, 0.6% sodium thiosulfate pentahydrate, and 0.07% zirconium-triethanolamine complex crosslinker. The viscosity at 191° C. was found similar to that of the test fluids with the same composition but without KCl.

Example 9

Test fluids were prepared with hard water pre-treated with appropriate chelating agent(s). In one test, hard water containing 120 mg/L Ca ions was treated with ethylene diamine tetracetic acid (EDTA) disodium (at the concentration of about 0.003 mole/L). The hard water was then used to prepare test fluids containing 0.06% sodium acrylate acrylamide copolymer (same as in Example 1), 0.54% CMHPG, 0.1% tetramethyl ammonium chloride, about 0.1% sodium diacetate, 0.51% 2,2',2"-nitrilotriethanol, 3% 120 g/L sodium sesquicarbonate solution, 0.6% sodium thiosulfate pentahydrate, and 0.07% zirconium-triethanolamine complex crosslinker. The fluid viscosity at 191° C. was found similar to those prepared with pure water.

Example 10

Sodium acrylate acrylamide copolymer pre-dispersed in mineral oil (same as in Example 1) was added to the already hydrated CMHPG. The sodium acrylate acrylamide copolymer pre-dispersed in mineral oil (same as in Example 1) was also added at the same time with the CMHPG powder, and then hydrated together. Both addition methods yielded similar viscosity behavior at 191° C.

Example 11

Figure 7:
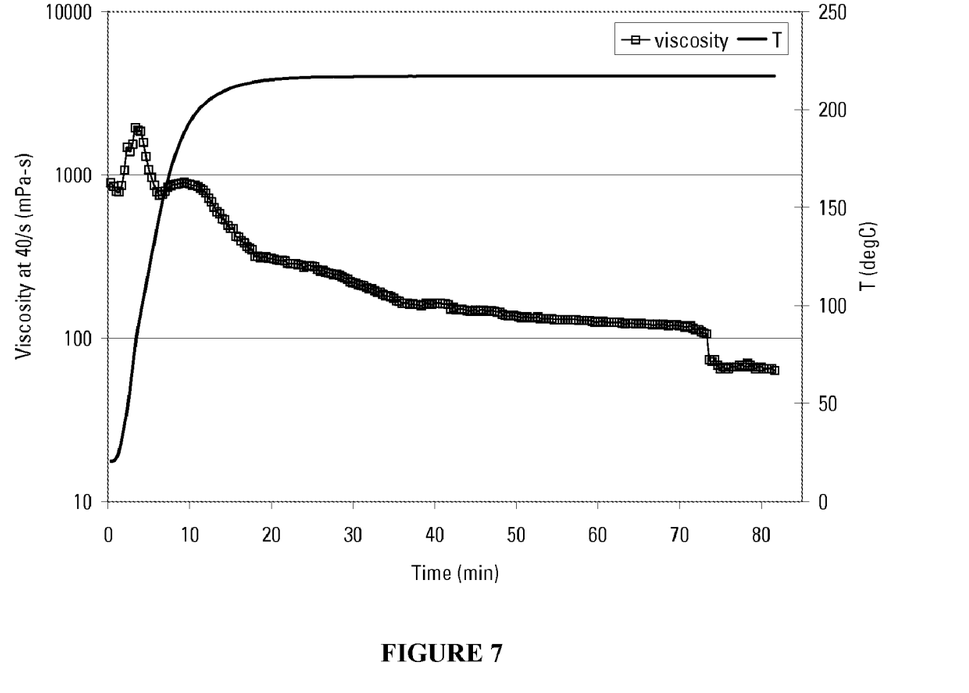
FIG. 7 shows a plot of the fluid viscosities at 218° C. of an aqueous CMHPG polymer fluid containing 0.37% by weight of a sodium acrylate acrylamide copolymer (MW: 12-15 million) at a shear rate of 40 s$^{-1}$.

A fluid containing 0.6% CMHPG, 0.1% tetramethyl ammonium chloride, 0.26% 2,2',2"-nitrilotriethanol, 2.4% 60 g/L sodium bicarbonate solution, 0.24% sodium thiosulfate pentahydrate, 0.37% sodium acrylate acrylamide copolymer (MW: 12-15 million), 0.07% zirconium-triethanolamine complex crosslinker, and 0.2% dihydroxybis (ammonium lactato) titanium crosslinker was tested using a Fann50-type viscometer at a shear rate of 40 s$^{-1}$. The results are presented in FIG. 7. At 218° C., the fluid stayed above 100 mPa-s for at least 52 minutes While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A method of treating a subterranean formation penetrated by a wellbore comprising:
   introducing a treatment fluid into the formation through the wellbore comprising an aqueous solution of a polysaccharide, a polyacrylamide, and a crosslinking agent, wherein the polyacrylamide is present in an amount of from about 0.01% to about 1% by weight of the fluid and
   wherein the polyacrylamide has an average molecular weight of from greater than 0.5 million to about 20 million.

2. The method of claim 1, wherein: the polysaccharide is selected from carboxymethylhydroxypropyl guar (CMHPG), hydroxypropyl guar, guar and combinations of these.

3. The method of claim 1, wherein: the polyacrylamide is a polyacrylamide homopolymer, a copolymer of acrylamide and acrylate monomers or a copolymer of acrylamide and other monomers.

4. The method of claim 1, wherein: the polyacrylamide is a copolymer of acrylamide and acrylate monomers or other monomers and wherein the acrylate or other monomers comprise from about 0.1% to about 50% of the copolymer.

5. The method of claim 1, wherein: the polysaccharide polymer is present in an amount of from about 0.1% or more by weight of the fluid.

6. The method of claim 1, wherein: the crosslinking agent is a Group 4 transition metal crosslinking agent.

7. The method of claim 6, wherein: the Group 4 transition metal crosslinking agent is selected from zirconium, titanium and hafnium crosslinking agents and is present in an amount of from about 0.01% to about 1.5% by weight of the fluid.

8. The method of claim 1, wherein: introducing the treatment fluid into the formation through the wellbore is at a pressure above the fracture pressure of the formation.

9. The method of claim 1, wherein: introducing the treatment fluid into the formation through the wellbore is at a viscosity of about 100 mPa-s or higher.

10. The method of claim 1, wherein: introducing the treatment fluid into the formation through the wellbore includes introducing the treatment fluid into a portion of the formation having a temperature of 120° C. or higher.

11. The method of claim 1, wherein: introducing the treatment fluid into the formation through the wellbore includes introducing the treatment fluid into a portion of the formation having a temperature of 230° C. or higher.

12. The method of claim 1, wherein: the fluid further comprising less than 0.1% by weight of any clay component.

13. A method of treating a subterranean formation penetrated by a wellbore comprising:
   introducing a treatment fluid into the formation through the wellbore comprising an aqueous solution of a polysaccharide, a polyacrylamide, a crosslinking agent, and less than 0.1% by weight of any clay component,
   wherein the polyacrylamide is incorporated in amount to sufficiently enhance high temperature endurance of the fluid and
   wherein the polyacrylamide has an average molecular weight of from greater than 0.5 million to about 20 million.

* * * * *